(12) United States Patent
Kilshaw

(10) Patent No.: US 8,392,280 B1
(45) Date of Patent: Mar. 5, 2013

(54) SYSTEM FOR ENABLING CONSUMERS TO EVALUATE AUTOMOBILE LEASES

(76) Inventor: Richard J. Kilshaw, Lake Oswego, OR (US)

( * ) Notice: Subject to any disclaimer, the term of this patent is extended or adjusted under 35 U.S.C. 154(b) by 1194 days.

(21) Appl. No.: 12/284,968

(22) Filed: Sep. 27, 2008

Related U.S. Application Data

(60) Provisional application No. 60/995,870, filed on Sep. 28, 2007.

(51) Int. Cl.
*G06Q 30/00* (2006.01)
(52) U.S. Cl. ..................... 705/26.64; 705/307
(58) Field of Classification Search .......... 705/26–27.2, 705/307
See application file for complete search history.

(56) References Cited

U.S. PATENT DOCUMENTS

| | | | |
|---|---|---|---|
| 5,794,219 A | 8/1998 | Brown | |
| 6,871,181 B2 * | 3/2005 | Kansal | 705/4 |
| 6,957,191 B1 | 10/2005 | Belcsak et al. | |
| 7,020,621 B1 | 3/2006 | Feria et al. | |
| 7,024,397 B1 | 4/2006 | Donahue | |
| 7,283,974 B2 | 10/2007 | Katz et al. | |
| 7,561,963 B2 * | 7/2009 | Brice et al. | 701/410 |
| 2002/0082860 A1 | 6/2002 | Johnson | |
| 2002/0082978 A1 | 6/2002 | Ghouri et al. | |
| 2002/0194051 A1 | 12/2002 | Hall et al. | |
| 2003/0014352 A1 | 1/2003 | Marzan | |
| 2004/0128224 A1 | 7/2004 | Dabney et al. | |
| 2006/0085318 A1 | 4/2006 | Cohoon | |
| 2006/0218084 A1 | 9/2006 | Krautter et al. | |
| 2007/0179798 A1 | 8/2007 | Inbarajan | |
| 2007/0244797 A1 | 10/2007 | Hinson et al. | |
| 2008/0052216 A1 | 2/2008 | Johnson et al. | |

OTHER PUBLICATIONS

Oppenheimer, Pete; "Including Real Options in Evaluating Terminal Cash Flows in Consumer Auto Leases," Financial Services Review; Summer 2002; 11, 2; pp. 135-151.*

* cited by examiner

*Primary Examiner* — Adam Levine
(74) *Attorney, Agent, or Firm* — Timothy E Siegel Patent Law, PLLC; Timothy E Siegel

(57) ABSTRACT

A system for enabling consumers to evaluate an automobile lease. The system includes a server bearing a lease evaluation algorithm and a client computer, which may be connected to the server over the Internet by a system user. After the system user connects said client computer to said server, said client computer prompts said system user to use said client computer to enter information about said lease. Said client computer sends said lease information to said server and said server responds by sending a lease evaluation to said client computer, for display to said user.

13 Claims, 8 Drawing Sheets

SYSTEM FOR ENABLING CONSUMERS TO EVALUATE AUTOMOBILE LEASES

RELATED APPLICATIONS

This application claims priority from provisional patent application U.S. Ser. No. 60/995,870, filed Sep. 28, 2007, which is incorporated by reference as if fully set forth herein.

BACKGROUND

There are many ways in which a user may procure a vehicle. One such method is commonly known as a lease. In order to protect buyers, rules have been set in place that regulate the fiscal information that must be disclosed in advertisements for leases.

Unfortunately, some potential lessees perceive the regulated information contained in vehicle lease advertisements, difficult to comprehend and as such, may rely on the monthly payment, normally in larger print, as the evaluation tool in determining the fiscal 'value' of the lease. As such, some lessees have expressed a desire for an easily understandable fiscal lease evaluation method.

Moreover, the US population is changing the way it procures vehicles. Traditionally, customers would visit a showroom, pick out a car, negotiate a deal and drive away.

Since the advent of the internet, it is now common for persons to research vehicles on-line and negotiate deals though email without ever visiting a dealer.

Exploiting this change, there are now many on-line web based businesses that entice visitors to part with their contact information, on the promise of 'great offers' from their automotive 'partners'. The visitor then receives a barrage of phone calls, quotes, offers and the like from dealerships across the country to whom their contact information has been provided, for a fee. The site visitor may spend more time removing his contact information from mailing lists than he could possibly save by way of receiving a relevant offer. As a result, potential lessees have expressed a desire to remain in control of their personal contact information yet still use the Internet in a savvy way, to obtain a vehicle.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect the present invention may take the form of a system for enabling consumers to evaluate an automobile lease. The system includes a server bearing a lease evaluation algorithm and a client computer, which may be connected to the server over the Internet by a system user. After the system user connects the client computer to the server, the client computer prompts the system user to use the client computer to enter information about the lease. The client computer sends the lease information to the server and the server responds by sending a lease evaluation to the client computer, for display to the user.

In a second separate aspect the present invention may take the form of a system for enabling consumers to solicit bids for an automobile lease, including a server and a multiplicity of dealer client computers that may be connected to the server through the Internet. The system also includes a multiplicity of consumer client computers, that may be connected to the server by way of the Internet. After a user connects his client computer to the server, he is prompted by the client computer to use the client computer to enter desired lease terms, which are posted to a protected area of the server. And where users of the dealer client computers may establish an account with the system, and are thereby permitted to view the postings and respond to a posting of desired lease terms, by accepting the lease terms, but are otherwise not permitted to see contact information for the user unless they accept the terms.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENTS

Figure 1:
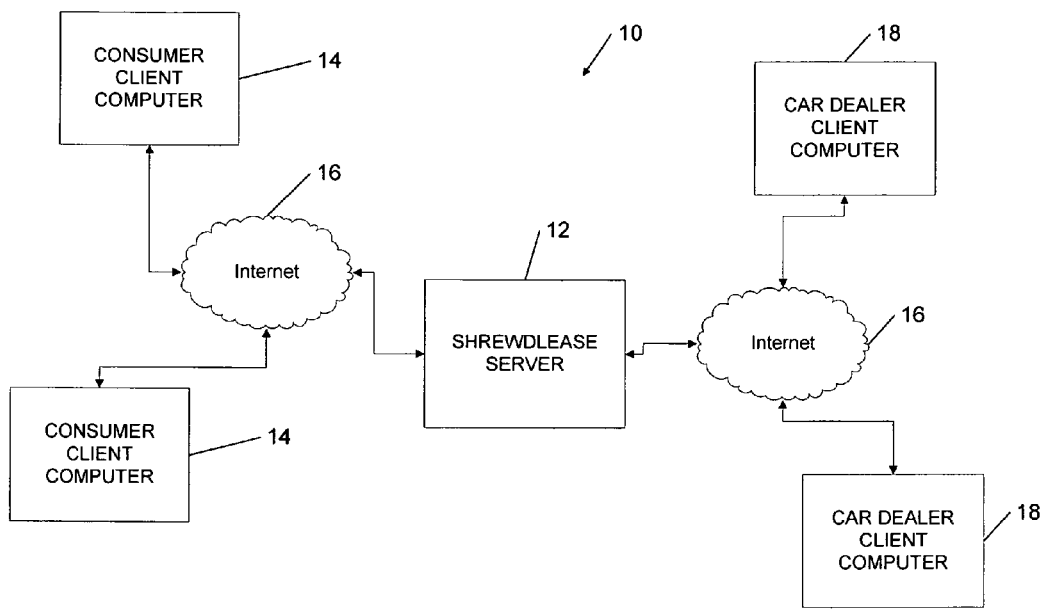
FIG. 1 is a functional block diagram of a system for facilitating consumer evaluation of a lease, according to the present invention.
Figure 2:
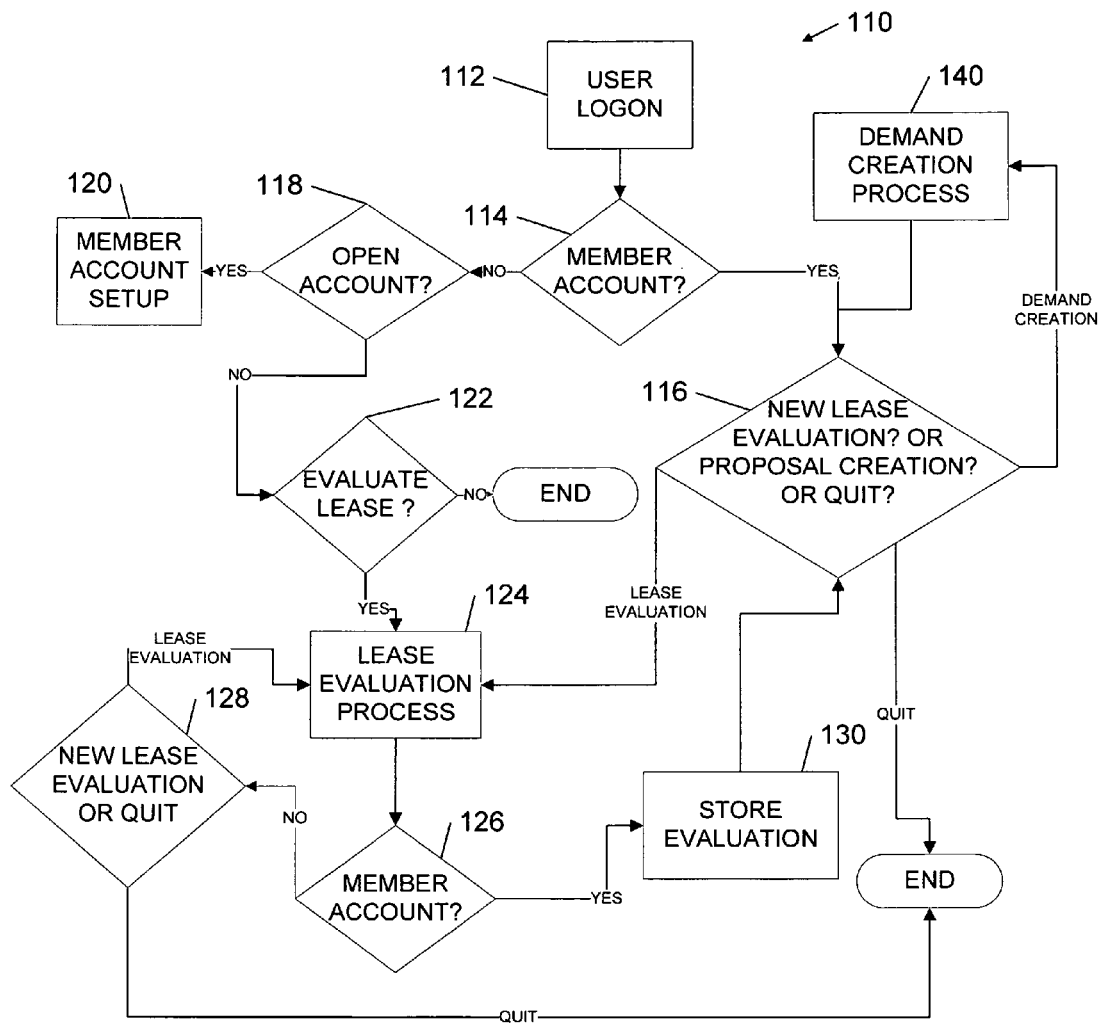
FIG. 2 is an overview flowchart of the process implemented by the system of the present invention.

Referring to FIG. 1, in one embodiment, the present invention is implemented on a system 10 including a server 12 hosting an Internet website that invites visitors using client computers 14 and connecting to server 12 over the Internet 16, to input data listed in a leasing advertisement or lessor offer. Car dealers also may log into server 12, using car dealer client computers 18. The interaction of car dealers with server 12 is discussed below, and is conducted using the car dealer client computers 18. Referring to FIG. 2, which shows the method 110 implemented by server 12. After a user logs into the website (block 112) by entering his Email address it is determined whether or not he already has an account (decision box 114). If the user does he enters his password and is queried (decision box 116) as to whether he wants to evaluate a lease or create a demand or quit. If he does not have an account he is asked (decision box 118) if he wants to open one. If he does, control passes to the member account setup function (block 120) described in greater detail in conjunction with FIG. 3. If he does not, he is still given the opportunity (decision box 122) to access the lease evaluation process (block 124). The process of gaining access is described further in conjunction with FIG. 4, and the lease evaluation algorithm is described further in conjunction with FIGS. 5A and 5B. After the lease evaluation process (block 124) the user who is not an account member is queried as to whether he would like to set up a member account, which would enable him to store the report (decision box 126). If he does not want to set up an account, he can still evaluate another lease, if he wants to (decision box 128). If he does become a member (or was already a member) he may now name and store the report (block 130).

Returning to decision box 116, which is available to newly created or preexisting members, if the user is a member, he may at any time he has a lease evaluation stored, decide (decision box 116) to create a demand (block 140). A returning member may have a lease evaluation stored from a previous session, whereas a new member may have a lease evaluation that has just been stored in the current session. The demand creation process is described in greater detail in conjunction with FIGS. 6A and 6B.

Figure 3:
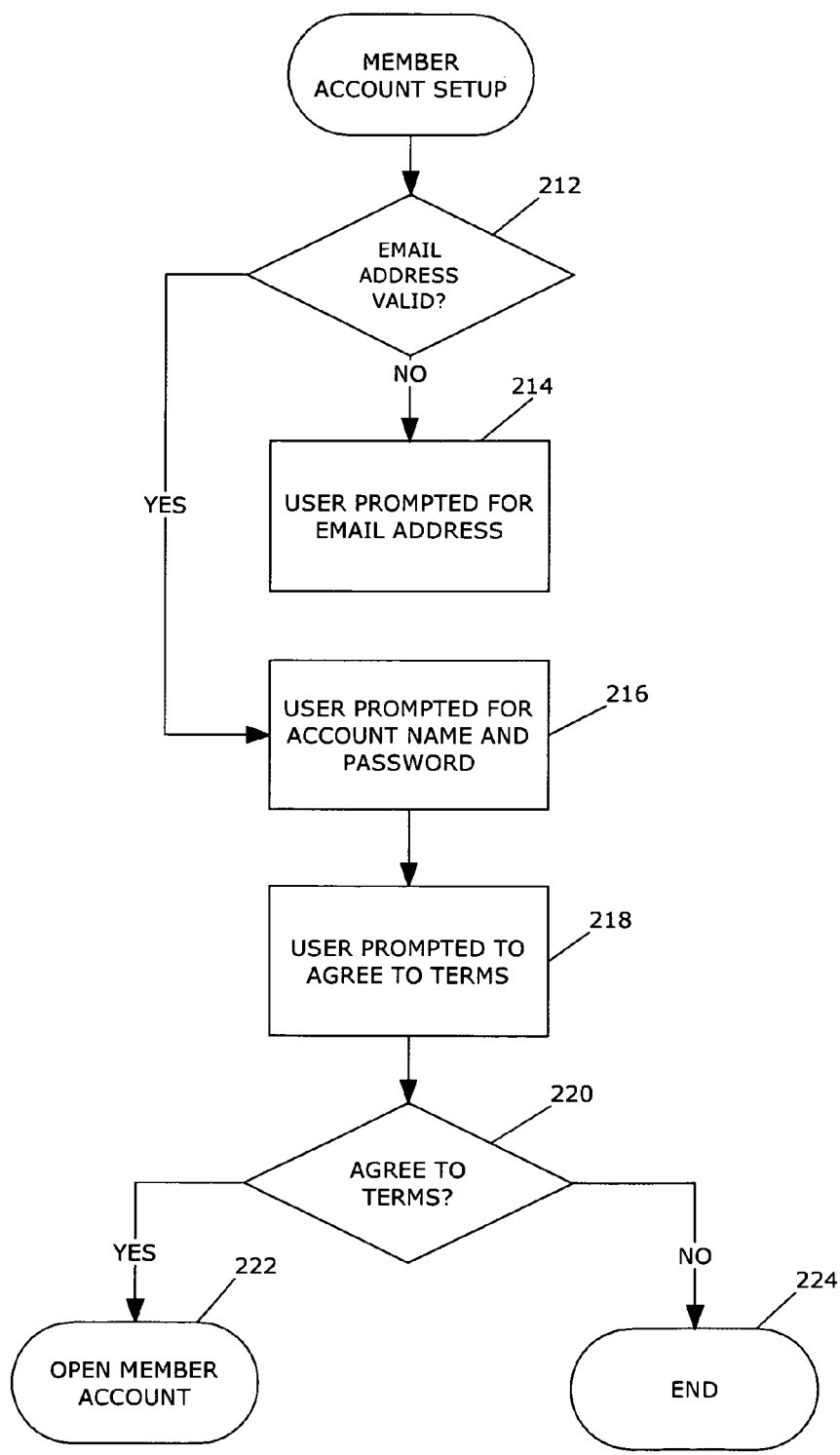
FIG. 3 is a flowchart breakout of block 120 from FIG. 2.

Referring to FIG. 3, the member account setup function begins with an examination of the email address entered by the user (decision box 212), if it is not in proper email form, the user is prompted to repeat the email address entering operation (block 214). Once an email address in correct form has been entered the user is prompted to enter an account name and password (block 216). The user is then asked if he will agree to terms listed, freeing the entity offering the lease evaluation service from liability and requiring the user to signify that he is using the service for his own consumer research (block 218). If the user agrees (decision box 220) the member account is opened (block 222) and the display is switched to effectuate decision box 116 (FIG. 2). If not, the user is required to leave the site (block 224).

Figure 4:
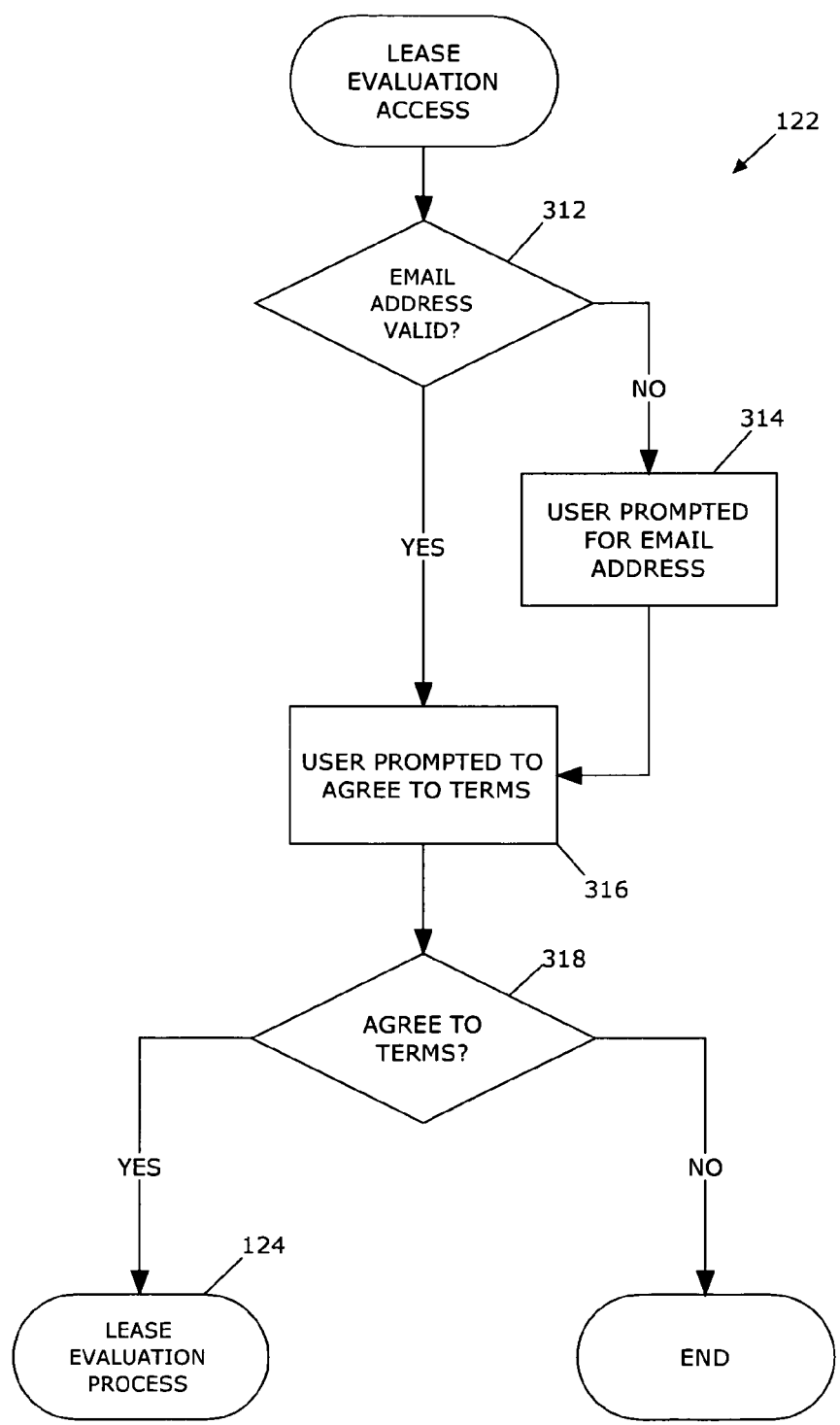
FIG. 4 is a flowchart breakout of block 122 from FIG. 2.

Referring to FIG. 4, the lease evaluation access process 122, similar to the account setup function, begins with an evaluation of the Email address entered by the user (decision box 312). If the user has entered an invalid Email address he is prompted to enter another 314. Presuming that a valid address is entered, the user is prompted to agree to the terms discussed above (block 316). If the user does agree (decision box 318) he proceeds to the lease evaluation process (block 124). If not the process is terminated.

Figure 5A:
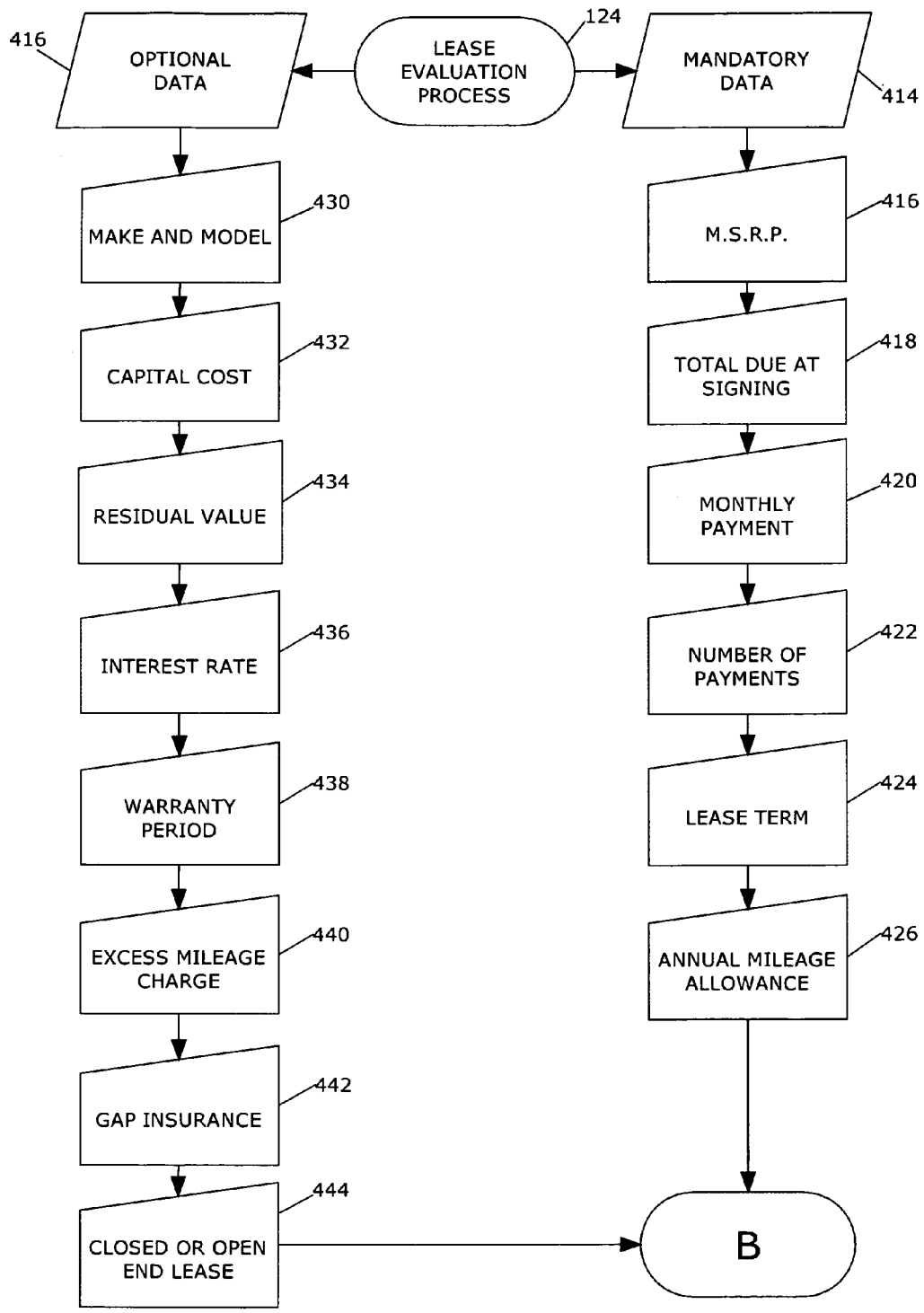
FIG. 5A is a flowchart breakout of a first portion of the lease evaluation process represented by block 124 of FIG. 2.

Referring to FIG. 5A, the lease evaluation process 124 begins with the user entry of mandatory data 414 and, if the user chooses, optional data 416. The mandatory data 414 consists of the manufacturers suggested retail price (MSRP [416]), the total due at signing 418, the monthly payment 420, the number of payments 422, the lease term 424 and the annual mileage allowance 426. The optional data includes the make and model 430, the capital cost 432 (the amount for which the vehicle is sold to the leasing company), the residual value 434 (the amount for which the user can purchase the vehicle at the end of the lease period), the prevailing borrowing interest rate 436, which is often voluntarily disclosed approximately in 'money factor' form by a potential lessor. (The money factor is a simple and reliable factor that can be applied quickly to approximate the average interest on loans or approximate the loan payments and is well known in the art).

Figure 5B:
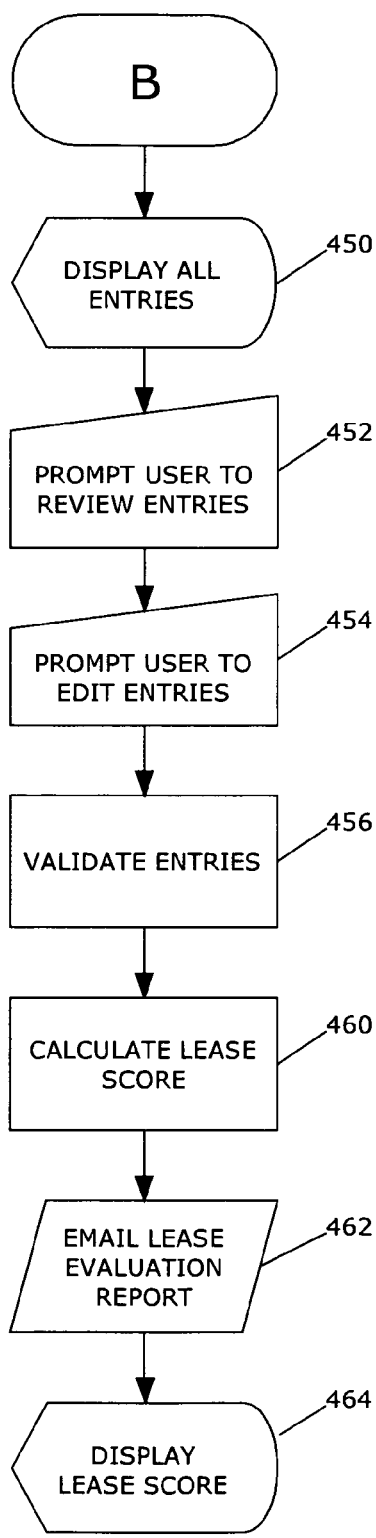
FIG. 5B is a flowchart breakout of a second portion of the lease evaluation process represented by block 124 of FIG. 2.

Alternatively the interest rate may be determined by system 10 by for example, using known user entries and employing the Newton-Raphson Method to algebraically determine the true loan interest rate. Other optional data that may be entered are the warranty period 438, the excess mileage charge 440, the GAP insurance 442, which protects the lessee from having to pay any amount in the event of an accident resulting in a total vehicle loss when the total due under the lease terms exceeds the insured vehicle value, and whether the lease offered is a 'closed end' or 'open end' lease 444. Most automobile leases offered are known as 'closed end' leases or 'walk away' leases. In a closed end lease, the lessee is not responsible for the value of the vehicle if it is returned to the lessor. In an 'open end' lease or 'finance' lease, the lessee may owe extra money if the value of the vehicle is determined to be lower than the final balloon payment. Referring to FIG. 5B, all entries are displayed to the user (block 450), who is prompted to review and edit the entries (blocks 452 and 454, respectively), and to validate the entries (block 456). Alternatively, the system 10 may validate the entries on behalf of the user. For example, if the residual value was calculated to be above a certain percentage of the MSRP and deemed unusually high, the system could prompt the user to make sure it was a correct entry. The server 12, then calculates the shrewdlease value 460, prepares and Emails the lease evaluation report 462 and displays the shrewdlease score to the user 464.

The website server 12 inputs the entered data to an algorithm that outputs values designed to help the user evaluate the lease. The table below shows the information provided in an exemplary usage of the system 10, which could be the figures displayed in bold in a lease advertisement. There is a great deal of variation in practice, regarding what is put in bold font in advertisements. The values in non-bolded font are calculated from the bolded data, as part of report preparation (block 462).

TABLE 1

Comparison of Lease Evaluations
Mazda

|  | Mazda 3 | CX-7 | Beetle | Jetta | MDX | Acura TL |
| --- | --- | --- | --- | --- | --- | --- |
| MSRP | 14390 | 24310 | 18195 | 21654 | 40665 | 34295 |
| Capital Cost | 13523 | 22785 | 17566 | 20794 | 40665 | 32822.32 |
| Total Cash Due at signing | 2999 | 3128 | 1664 | 3053 | 4999 | 2599 |
| Lease payment | 119 | 169 | 199 | 199 | 399 | 299 |
| Term | 24 | 24 | 36 | 36 | 36 | 36 |
| Annual Mileage | 10500 | 10500 | 10000 | 10000 | 10000 | 10000 |
| Subtotal | 2737 | 3887 | 6965 | 6965 | 13965 | 10465 |
| Total Lease Cost | 5736 | 7015 | 8629 | 10018 | 18964 | 13064 |
| Residual Value (REF) | 9929 | 16773 | 10197 | 12559 | 25618 | 20577 |
| Estimated % Total annual | 69.0 | 69.0 | 56.0 | 58.0 | 63.0 | 60.0 |
| Costs | 2868.00 | 3507.50 | 2876.33 | 3339.33 | 6321.33 | 4354.67 |
| Total Allowed Mileage | 21000 | 21000 | 30000 | 30000 | 30000 | 30000 |
| Lease Cost per Mile | 0.27 | 0.33 | 0.29 | 0.33 | 0.63 | 0.44 |

TABLE 1-continued

Comparison of Lease Evaluations
Mazda

|  | Mazda 3 | CX-7 | Beetle | Jetta | MDX | Acura TL |
|---|---|---|---|---|---|---|
| Excess Mileage Charge | | | | | | |
| ShrewdValue | 5.27 | 7.28 | 6.33 | 6.48 | 6.43 | 7.88 |
| Shrewd Down Adjuster | 2.51 | 2.11 | 0.85 | 1.42 | 1.21 | 0.88 |
| ShrewdLeaseScore | 2.76 | 5.17 | 5.48 | 5.06 | 5.22 | 7.00 |

One exemplary formula sub-totals the total monthly payments with the cash due at signing and divides by the total allowed mileage, to give a true lease cost per mile. The MSRP is then divided by the cost per mile, the result divided by a constant (in this example =10000) to give an preliminary overall indicator of lease value, which in one embodiment is dubbed the "shrewd value." This indicator typically falls in the range of approx 2-12 (for data taken from 36 lease advertisement published in 2007).

In a preferred embodiment, once a substantial number of leases have been scored (for example 1000) the system calculates and then presents the average score to users. This information is useful to assist a user in determining the desirability of the lease under consideration. Alternatively, vehicle manufacturers and dealers can use the average score to make sure their advertised leases are competitive in the market place.

Because the manufacturer sets the MSRP based on perceived market price acceptance, it is a reasonable measure of vehicle value. The MSRP is also the value most lessors use to establish end of lease residual values (see % in table). Accordingly, it is informative to use the relationship between the MSRP and the true lease cost per mile to provide an indicator of how favorable a proposed lease is to the prospective lessee.

Because dealerships know many potential lessees are attracted by a low advertised monthly payment, it is a fairly common practice for a dealership to raise the required down payment, which is usually shown in very fine print, while lowering the more prominently advertised monthly lease payment. In order to draw attention to this misleading action, a second value 'shrewd down adjuster' is also calculated, and subtracted from the 'shrewd value' to arrive at a final overall indicator of lease desirability, which in one preferred embodiment is dubbed the "shrewd lease score." The 'shrewd down adjuster' is calculated by dividing the total due at signing (less the first months payment) by the total lease cost. The result is multiplied by a constant, in the table example above, =5. In the first example (Mazda 3) the deposit being advertised by the dealer makes up 52% of the total lease cost. In this case, the monthly payment of $119 does not serve as a fair representation of total lease costs.

In an alternative preferred embodiment, the final overall indicator of lease desirability is presented in a 'rating' format. For example, the shrewd lease score of 7.07 for the Acura RL (as listed in table 1) can be shown as 'B+'. The Mazda 3 is shown as a 'D−'. Such a rating provides a user with an easy to understand indicator of lease value.

Yet another preferred embodiment portrays the lease score in terms of 1/10 fractions. For example, the Beetle shrewd lease score of 5.48 could be converted mathematically any displayed to the user as 6/10. Such a display further assists a user in swiftly determining the indicated value of the lease being evaluated.

The web site hosted by server 12 further provides each user with a detailed report on what each user-entered value means and how it affects the fiscal lease result. This report serves as an informative tool, helping the potential lessee to make a sound financial decision without regard to the make of model selection being considered. Ultimately, the service may deprive advertisers of the benefits of deceptive practices, thereby improving the presentation of information in lease advertising.

A preferred embodiment exists that also asks a user for the manufacturers warranty period, provided on the lease vehicle. If the fixed lease term is calculated to be longer than the manufacturers warranty or the total allowed mileage under the lease terms exceeds the warranted mileage a 'shrewd Warranty Adjuster' is deducted from the 'shrewd value' to further reduce the 'shrewd lease score'. Leasing a vehicle beyond the manufacturers warranty renders a lessor financially responsible for repairs, on a vehicle he does not own. This clearly makes the lease less desirable overall.

Another preferred embodiment asks the user to confirm the type of lease being offered. If the lease on offer is an 'open end' lease or 'finance lease' then a further reduction could be made to lower the final 'shrewd lease score' Warnings about the lessee's risk of financial liability on the vehicle end of lease value can also be made in the detailed report. Clearly a lease where a lessee is responsible for the value of the vehicle at the lease end is less attractive over a closed end lease where the lessee has no such responsibility.

Another preferred embodiment asks the user to confirm if the lease vehicle is offered with guaranteed asset protection (GAP) insurance. Closed end leases often leave the lessee in a condition in which a higher balance is owed on the lease than the vehicle is deemed to be worth by the lessee's insurers ("upside-down" in industry parlance). In this situation, without GAP insurance, if the vehicle is the subject of a total loss insurance claim, the lessee is liable for the difference. To reflect this potential problem, if the lease does not have GAP insurance built into its terms, a 'shrewd GAP adjuster' is deducted from the 'shrewd value'.

Although the process described above is particularly well suited to brand new vehicles, in an alternative preferred embodiment it is adapted to evaluate used vehicle leases. In this embodiment the MSRP is replaced by an industry known used vehicle pricing authority's suggested used value. Such values are available from the National Automobile Dealers Association (NADA) recommended used retail prices, Galves Auto Price list, or Kelly Blue Book 'book value' for a particular make or model of vehicle, year of manufacture and travelled mileage.

The process described above uses basic fiscal information contained in a typical lease offer as inputs and returns a lease evaluation in the form of a detailed report and number. In an alternative preferred embodiment the evaluation score and lease inputs can be used to determine a 'sale price' of a vehicle, which can then be used in a listing that solicits lease bids from auto dealers.

Figure 6A:
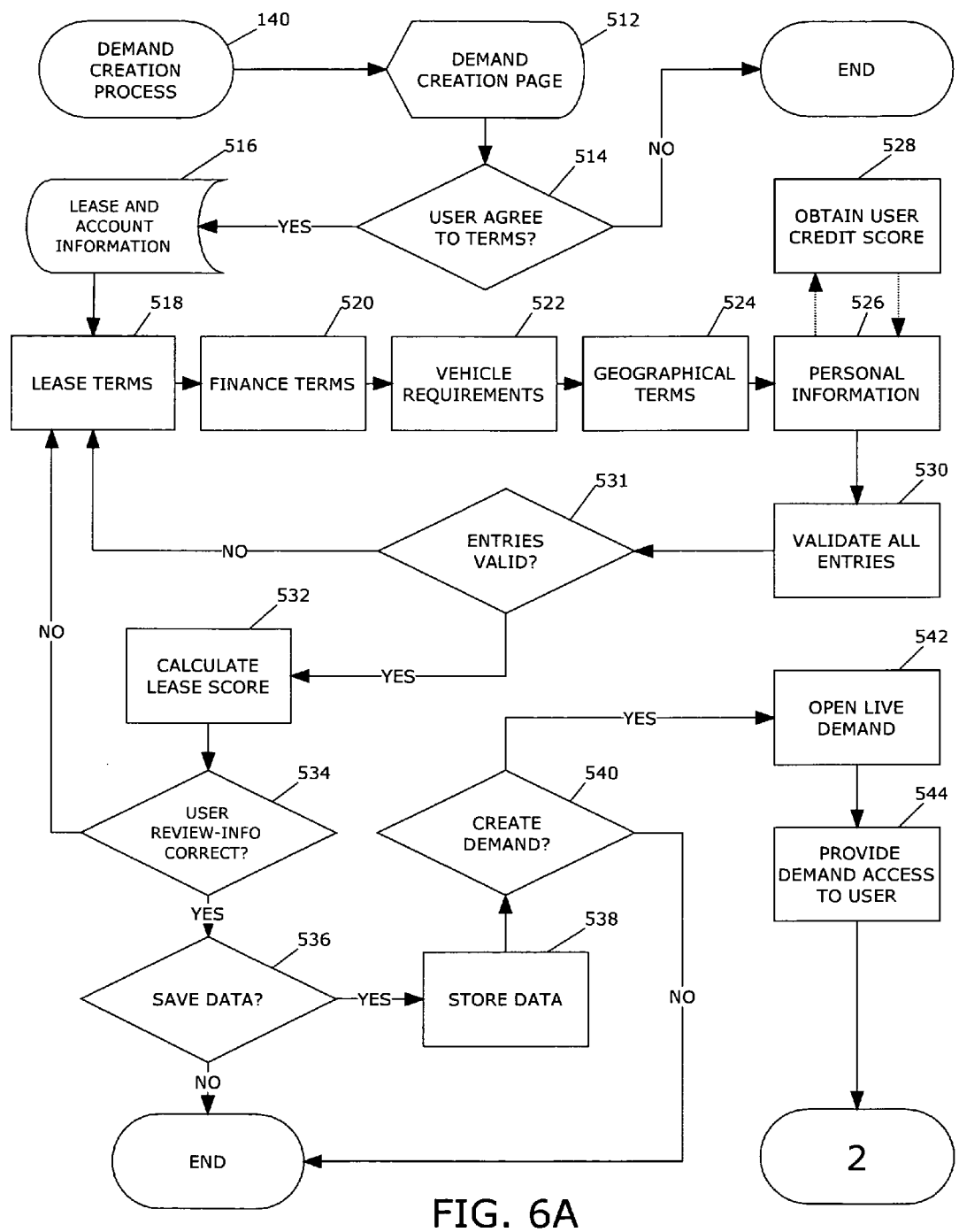
FIG. 6A is a flowchart breakout of a first portion of the demand creation process represented by block 140 of FIG. 2.

After obtaining the lease evaluation score and the report, a user may decide to use the demand creation process 140, to create and send a demand to automobile dealers that offer leases. Referring to FIG. 6A the user selects a stored evaluation to serve as a basis for his demand clicks a button that takes him to the demand creation page (block 512), where he is asked to accept a set of terms (decision box 514), if he does the lease and account information from the selected lease information and his account information are loaded into the demand creation module (data block 516). The user is then given the opportunity to alter the lease terms (block 518), the finance terms (block 520), the vehicle requirements (block 522), by for example selecting a particular exterior color or interior finish, the geographical terms (block 524), for example limiting the distance he will travel to go to a dealership meeting his demand. He also enters sufficient personal information (block 526) to permit system 10 to retrieve one or more credit scores (block 528) for the system user. The user is prompted to validate the entries (block 530) and is prompted to correct any invalid entries. If he indicates that all entries are valid (decision box 531) the system 10 calculates a lease score (block 532) which is provided to the user so that he can verify that his demand will be reasonable, without being too generous to the dealers. If the score indicates that the lease he is demanding is unrealistic or not sufficiently advantageous to the user, he may change the values (decision box 534) otherwise he is asked if the data should be saved (decision box 536) and the data is stored (block 538). The user is then queried as to whether a demand should be opened (decision box 540). If the answer is yes a demand is opened (block 542) with access provided to the user (544). In general philosophy the demand contains as much information as possible to allow a dealer to structure a suitable deal to meet it. For example, the credit scores of the user are disclosed, so that the dealer can be confident that he will not encounter problems when trying to secure funding on behalf of the lessee once the lessee personal information is finally released to him. The zip code of the user signifying the locality of the user or local of vehicle registration should be disclosed since this information could have state or district tax implications that the dealer may have to account for when structuring the lease, if the total lease payments demanded by the user are to include tax charges.

Alternatively, this information may be useful to a dealer if the customer has specified that the vehicle must be delivered to their home address. Transportation costs could be quite high should a user reside many hundreds of miles away from a dealer. The dealer may have to account for the incurred delivery costs when deciding to commit. The demand may include information such as whether a user is willing to even consider an alternative offer from a dealer. Time may be wasted, by a dealer preparing an alternative offer in the example where a user has established that they will not be accepting alternative offers, if this information is not provided. The demand should not include any information that could allow a dealer to identify a user or compromise a user state of anonymousness. The demand should not contain any information that would allow a dealer to make any direct contact with a user before a commitment is made.

Figure 6B:
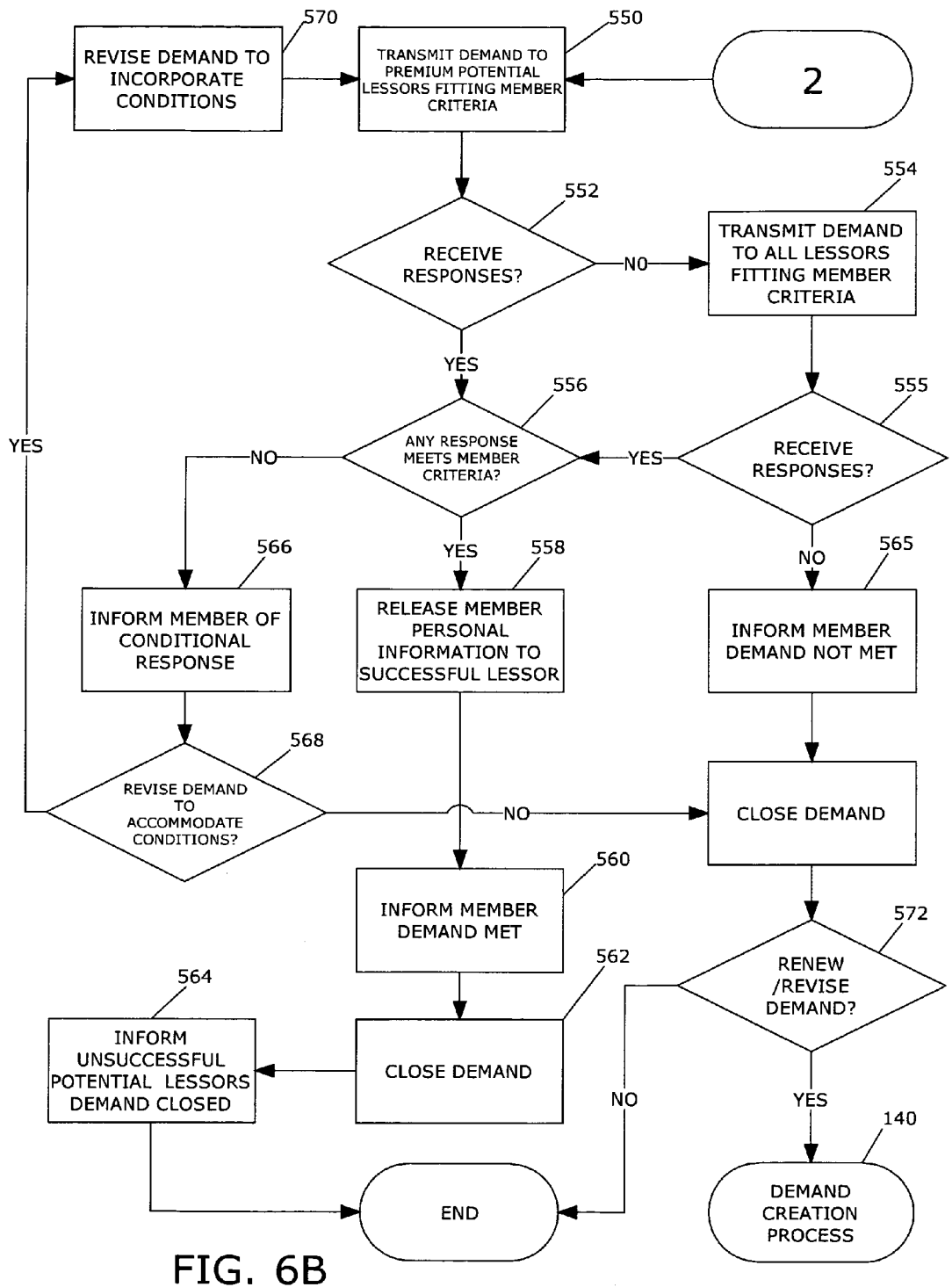
FIG. 6B is a flowchart breakout of a second portion of the demand creation process represented by block 140 of FIG. 2.

Referring now to FIG. 6B, the demand is first transmitted to car dealers paying a premium to gain first access to the demands (block 550). The car dealers may see the demands posted on their car dealer client computers 18, and may in addition receive Email notifications. If no responses are received from this group (decision box 552) the demand is sent to a broader group of dealers (block 554). Any responses received from either the premium, or in the alternative, from the broader group (decision box 555) are reviewed to determine if they meet the member criteria (decision box 556). In one preferred embodiment a hierarchy of car dealer accounts is established, with each higher level paying higher account fees, but being able to see lease demands, earlier than lower account levels. If a dealer meets a demand, the member personal information is released to the successful lessor bidder (block 558), the member is informed that his terms have been met (Block 560), the demand is closed (Block 562) and the unsuccessful dealers are informed that the demand is closed (Block 564). If no response meeting the demand terms is received, but a conditional response is received, the member is informed (Block 566) and given a chance to revise his demand to accommodate the conditions (Decision box 568). If he does the revised demand (block 570) is transmitted in the same pattern as before, first to premium dealers and if none of them accept it to the broader group. If the member decides to not revise his demand the demand is closed. If no responses are received, the member is informed the demand has not been met (block 565) and the demand is closed. The member may then create a revised, or an entirely new, demand (Decision box 572), or may quit.

EXAMPLE

In this example, the system 10 may be referred as "ShrewdLease." A system user wishes to spend $300 a month on a closed end lease, has $2500 spare to put forward as a down payment, intends to drive 12000 miles a year, prefers to dispose of his car every three years and has an excellent credit history.

The system user reviewed the on-line ads and found the following ad on the Honda web site:
2008 Ridgeline RTX Featured Special Lease
$309.00 per month for 36 months. $3,009.00 total due at signing.

FEATURED SPECIAL LEASE: Closed-end lease for 2008 Ridgeline RTX Automatic Transmission (Model YK1638EW) for $309.00 per month for 36 months with a $2,105.00 capitalized cost reduction available to customers who qualify for the AHFC Super Preferred credit tier. Other rates/tiers are available under this offer. $3,009.00 total due at lease signing (includes first month's payment, security deposit, AHFC upfront acquisition fee and capitalized cost reduction; total net capitalized cost and base monthly payment does not include tax, license, title, registration, documentation fees, options, insurance and the like). Security deposit waived in lease example. Not all buyers may qualify.

Subject to limited availability. Through Oct. 31, 2007, to approved lessees by American Honda Finance Corp. Closed end lease for 2008 Ridgeline RTX Automatic Transmission vehicles (Model YK1638EW), for well qualified lessees. Not all lessees will qualify. Higher lease rates apply for lessees with lower credit ratings. MSRP $30,135.00 (includes destination) less the capitalized cost reduction resulting in actual net capitalized cost $25,618.34. Dealer contribution may vary and could affect actual lease payment. Taxes, license, title fees, options and insurance extra. Total monthly payments $11,124.00. Option to purchase at lease end $18,081.00. Lessee responsible for maintenance, excessive wear/tear and 15 cents/ml. over 12,000 miles/year for vehicles with MSRP less than $30,000, but for vehicles with MSRP of $30,000 or more, mileage cost is 20 cents/ml. over 12,000 miles/year. See dealer for complete details.

The system user used system 10 to obtain the lease report shown in Table II, which lists a 'shrewd lease score' using the numbers provided in the Honda ad:

Table II: Exemplary Lease Evaluation Report

MSRP

This is short for 'Manufacturers Suggested Retail Price' and is established by the manufacturer. This value positions the vehicle within the marketplace and is the 'benchmark' that is continually referred to by all sectors of the automotive industry.

Your ShrewdLease entry $30,135.00

It is clear you are looking at a vehicle toward the Luxury end of the market

Capital Cost

This is the true sale price of the vehicle. Even though you are leasing the vehicle (you are the "Lessee"), a 'sale' is still made by the dealer to the leasing company/lender (the "Lessor") that manages the lease.

Your ShrewdLease entry $25,618.34

Your capital cost entry is $4516.66 lower than the MSRP. This indicates a substantial discount is being offered on the vehicle. This fact is a good indicator that you may be on your way to a very Shrewd Lease!

Total Due at Signing

This, is the total amount of money to be paid at or before signing the lease papers. It is sometimes referred to as a 'Capital Cost Reduction' or 'Down Payment'. It can be made up entirely of cash, or could be paid in part or whole with a trade-in vehicle. You may even trade-in a car, receive some 'cash back', and use the remaining equity to cover this charge.

Your ShrewdLease entry $3,009.00

This down payment makes up 21% of the 'total lease costs'. Viewed another way, it is 9 times the monthly payment. Let's suppose at the end of this lease, you decide to return this vehicle and negotiate a similar lease on a new vehicle. Since you do not own the first vehicle, you do not have any 'equity' in it, to put toward another $3009 down payment. You will instead, have to put your hand back in your pocket and pay again! Although one of the main selling points of a lease is 'fixed cost motoring', this is only truly achieved when a consumer can transition from one car to another, without a 'spike' in fixed costs. A Shrewd Lessee may negotiate a down payment closer to, or even equal to just one monthly payment!

Monthly Lease Payment

This is the fixed monthly charge you agree to pay, in exchange for the exclusive use of the vehicle.

Your ShrewdLease entry $309.00

Lease Term

This is the fixed period of time you will have the exclusive use of the vehicle.

Your ShrewdLease entry 36 Months

This lease period is close to the industry average. This duration tends to provide for a well balanced lease.

Total Number of Payments

This is the total number of monthly payments you will be obliged to make under the terms of the lease.

Your ShrewdLease entry 36 Payments

The monthly payment count matches the lease term. This means a payment will be due for each and every month of the lease duration.

Total Lease Costs

This is the sum of the 'down payment' and all of the 'monthly payments' added together. It is the total amount committed to be paid, under the terms of the lease.

ShrewdLease Calculated 'Total Lease Cost' $ 13,824.00

An important check is to make sure the 'Total Lease Cost' shown in your lease advertisement, quote, or agreement, matches the value calculated here by ShrewdLease. If it does not, we recommend you ask the dealer to verify their numbers and run a new ShrewdLease report. A work sheet that can be passed directly to the dealer for this reason can be downloaded at www.shrewdlease.com Our research has shown that on average, 1 in 10 newspaper lease advertisements contain a numerical error!

Annual Mileage Allowance

This is the number of allocated miles that the lease provides for. Contrary to popular belief, you are in no way limited to this mileage when you lease a vehicle. You just have to pay for the privilege, should you exceed it!

Your ShrewdLease entry 12000 Miles

With an annual allowance of 12000 and a total lease term of 36 months, the total mileage that can be driven during the lease, before incurring extra charges, is 36000 miles. This mileage allowance is around the national average, for new vehicles. If you normally drive, or are intending to drive this amount, this allowance should be well suited for you.

Option to Purchase Price

This is the pre-determined price you may buy the vehicle for when the lease ends. It is normally based on what the leasing company/lender estimates the vehicle will be worth at that time, having driven the allocated mileage. Contrary to popular belief, it is purely a speculative value. It has absolutely nothing to do with the true value of the vehicle at lease end.

Your ShrewdLease entry $ 18,081.00

Your option to purchase price of $18081 is 60% of the MSRP. This value has a big effect on your ShrewdLease score! High 'option to purchase prices' are associated with vehicles that command high resale values. A higher resale value provides the foundation upon which a lower overall leasing cost may be achieved. Vehicles that do not hold their value as well generally have lower 'option to purchase' prices and conversely, higher leasing costs. Shrewd lessees will look toward leasing vehicles that maintain higher resale values.

Excess Mileage Charge

Should you have exceeded the allocated mileage at lease end and you 'hand the car and keys back' to the lender, this is the charge per extra mile, you will be obliged to pay.

Your ShrewdLease entry 20 cents

This charge is very low in view of the other entries made! If you were to exceed the mileage allowance, the penalty incurred would barely cover the extra depreciation the higher mileage would likely cause! This fact would indicate a ShrewdLease, in the event of exceeding the mileage allowance!

Manufacturers Warranty Period

This is the warranty provided by the manufacturer. It gives you the peace of mind that during this period, any costs of fixing problems (covered under the warranty) are not paid by you.

Your ShrewdLease entry

You did not make an entry for this field!

ShrewdLease suggests you consider the warranty period while reviewing any lease and avoid leasing a vehicle beyond the warranty period!

ShrewdLease Score

Using our proprietary statistical software, the numerous values you have entered are compared, analyzed and evaluated in relation to each other, and a single ShrewdLease score is calculated. This number is very powerful! Not merely just a result, it can be used to your advantage in many ways!

Your ShrewdLease Score 7.07

Your ShrewdLease score of 7.07 represents a considerably shrewd lease! You can rest assured you would be getting good value for money as the numbers stand. Although addressing any ShrewdLease suggestions shown in this report may allow for an improvement, if this is the vehicle you desire, you can rest assured you have done your homework and may take pride in knowing you would make a shrewd lessee with this deal!

ShrewdLease Bonus Tip

The 'Total lease cost' is an important number. It is the amount of money you will spend, if you commit to a lease. Always remember that with a lease, this is money spent, not money invested!

The system user is quite taken by the Honda Ridgeline and gets a chance to try out the vehicle as his golfing partner just bought his wife the exact same car. As ShrewdLease scored this lease 7.07, after reading the ShrewdLease report, he knows Honda is offering a reasonably good deal and decides this is the vehicle he wants to lease.

The system user has, however, set his budget: $300 a month, $2500 to put forward as a down payment, and intends to drive 12000 miles a year.

The system user goes to the ShrewdLease website, establishes his membership, enters the new 'ShrewdLease Negotiator' and follows the on-screen steps:

Section 1—Vehicle Details

The system user enters his chosen vehicle: 2008 Ridgeline RTX Auto. Under color, he enters red or black.

Section 2. Dealer Details

Under Dealer distance, he enters 'In my State'

Section 3—Lease Details

Under Total Due at signing, he enters $2500 max

Under monthly lease payment, he enters $300 max

Under lease term he enters '36' months max

Under Annual Mileage he enters '12000'

Under option to purchase he enters—Any

Under Excess miles he enters '20' cents max

Section 4—Credit Report Details

The system user enters all his personal information and receives immediate credit report information from Experian, Equifax & Transunion credit agencies from ShrewdLease on-line software collaboration with an on-line credit reporting agency Section 5—Commitment to Lease The system user reads the terms and agrees to them. The terms explain that his vehicle information, lease entry information, credit scores (but not personal information) will now post on the ShrewdLease Negotiator 'Lessee Lease Offer' for 24 hours. After 24 hours, unless there is a 'connection' he will be emailed and prompted to re-post his offer again. For each 24 hours that pass, he must re-post.

The system user has made no financial commitment to achieve this. He also has not made any contractual commitment. He has however made a considerable time commitment by going to the trouble to research his car, evaluate the advertised Honda lease, post a lessee offer, check his credit scores and has agreed to the terms of the site which request he be 'ready to lease immediately' should a dealer take on his 'Lease offer'

The system user may now relax, happy that his negotiating is over, without even talking to a showroom salesman.

The system user's lease offer is posted on ShrewdLease, in the 'dealers only' area. All registered dealers and agents may access the dealer only area at any time. Premium dealers receive instant email notifications; every time a new 'lessee offer' is posted.

The system user's posting shows:
NEW LESSEE OFFER
Vehicle-2008 Ridgeline RTX Auto
Color—red or black.
Dealer Location—Oregon Only
Lease Details—
Total On signing $2500 max
Monthly lease payment $300 max
Lease term 36 months max
Annual Mileage 12000
Excess miles 20 cents max
Residual Value—Not specified
Credit Report Scores—
Experian 710
Equifax 690
Transunion 702
(Also appearing under the posting, the ShrewdLease score and the approximate 'sale price' that a dealer would have to sell the Honda for, in order to achieve The system user's lease offer. This is generated internally by ShrewdLease using software that carries up to date residual values, current lease interest rates, delivery charges, sales tax rates for each state etc.)
Shrewdlease score 7.67
Estimated Gross capital cost $24785
Based on Residual of 18,081.00
Using AHFC subsidized lease rate valid until Oct. 31, 2007

Honda of Oregon City must sell 1 more Ridgeline to achieve their month's sales target of 75 vehicles with 10 Ridgelines, to qualify for their $1000 bonus per car for the month. They decide that although selling a Ridgeline for $24700 leaves them making a small loss, achieving their month's sales quota is more important. The sales manager agrees to meet the Lessee Offer posted on ShrewdLease.

Under the ShrewdLease terms, for Honda of Oregon City to commit to The system user's lessee offer, they must allocate a VIN number for the vehicle they have available that matches the lessee offer, and post it to ShrewdLease. They must also complete the on-line pro-form a lease agreement, to show the entire breakdown of the lease, meeting The system user's numbers and vehicle requirement.

Once completed, the pro-form a invoice is emailed to the system user by ShrewdLease, along with the dealership contact information.

The system user knows under the terms of the service, as soon as a pro-form a invoice meeting his offer is raised, along with a VIN number allocation for a car that matches his specific choice, his deal has been met and his personal information is now released to the dealer for processing of the paperwork.

Honda of Oregon City telephones the system user immediately and he agrees to collect his new Honda Ridgeline the very next morning.

ShrewdLease takes an account payment from Honda Oregon City upon their entering a VIN number and pro-form a invoice.

One possible problem with the above described embodiment of system 10 is that some users might take advantage of the system to gather information, rather than to find a lease. For example, a first auto dealer might use the system in an attempt to find out what best terms a second auto dealership was offering. Even without further safeguards, it may be possible to identify an Internet address associated with a data gatherer and then deny access to that party.

A number of alternative preferred embodiments exist for raising the cost for system use aimed at gathering data, rather than actually attempting to enter into a lease agreement.

In one preferred embodiment a credit card deposit is taken from the prospective Lessee, who thereby shows more commitment to a prospective deal. This could be held and passed on to the dealer once they allocate a VIN number. In the alternative, credit card information would be taken, with the stipulation that a deposit would automatically be taken from the credit account if a lease offer meeting all proposed terms was forwarded to the user.

In another alternative preferred embodiment it would be possible for a dealer to send a proposal to a system user that did not entirely fit the terms from the system user. For instance, in the example given above, a dealer from out of state could be permitted to respond, if he met all the other terms.

In another preferred embodiment the system user is advised that when the "accept" button is pressed a binding contract will be formed.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A system for enabling consumers to evaluate a proposed lease for an automobile, said lease having terms including maximum mileage user is allowed to drive said automobile without incurring an overage charge, lease term, periodically due payments, total due at signing, and wherein a manufacturer's suggested retail price (MSRP) is associated to said automobile, said system comprising:
   (a) a server bearing a lease evaluation algorithm;
   (b) a client computer, which is connected to said server over the Internet by a system user; and
   (c) whereby after said system user connects said client computer to said server, said client computer prompts said system user to use said client computer to enter information about said lease including information sufficient to permit computation of total mileage, which is said maximum mileage user is allowed to drive said automobile without incurring an overage charge summed over said lease term; said lease term; amount and time due of each said periodically due payments; and said total due at signing; and said MSRP for said automobile; and
   (d) whereby said client computer sends said lease information to said server and said server responds by computing a lease evaluation metric, reflecting MSRP divided by an evaluation of lease cost per mile, wherein lease cost per mile is computed as total payment divided by total mileage, and wherein total payment equals a total of said periodically due payments over said lease term, plus total due at signing, and said server computes and sends a figure reflective of said metric to said client computer for display to said user.

2. The system of claim 1, wherein the total annual costs of said lease are returned to said user as part of said lease evaluation.

3. The system of claim 1, wherein said lease evaluation metric evaluates the overall desirability of the proposed lease terms.

4. The system of claim 3, wherein said metric is stated in terms of a decimal number.

5. The system of claim 3, wherein said metric is stated in terms of a letter grade.

6. The system of claim 3, wherein said system user is prompted to indicate whether or not guaranteed asset protection insurance is provided as part of said lease being evaluated.

7. The system of claim 6, wherein if guaranteed asset protection insurance is not provided, the metric is adjusted in such a manner as to advise said system user that said lease is not as desirable as it would otherwise be.

8. The system of claim 1, wherein said figure is said metric times a constant.

9. The system of claim 8, wherein said constant does not equal 1, so that said figure does not equal said metric.

10. The system of claim 1, wherein said server computes an additional metric by dividing said total due at signing by said total payment and computes and sends an additional figure reflective of said additional metric to said client computer for display to said user, thereby providing said user with an indication of to what degree said monthly payments have been reduced by a large total due at signing.

11. The system of claim 10, wherein said additional figure is said additional metric times a constant.

12. The system of claim 11, wherein said constant does not equal 1, so that said figure does not equal said metric.

13. The system of claim 10 wherein said figure and said additional figure both equal the same linear combination of said metric and said additional metric.

* * * * *